US009454736B2

(12) United States Patent
Reuveni et al.

(10) Patent No.: US 9,454,736 B2
(45) Date of Patent: Sep. 27, 2016

(54) SYSTEM AND METHOD FOR QUEUE MANAGEMENT

(75) Inventors: Eran Reuveni, Tel Aviv (IL); Assaf Silberstein, New York, NY (US)

(73) Assignee: Q-nomy Inc., New York, NY (US)

( * ) Notice: Subject to any disclaimer, the term of this patent is extended or adjusted under 35 U.S.C. 154(b) by 1170 days.

(21) Appl. No.: 12/413,625

(22) Filed: Mar. 30, 2009

(65) Prior Publication Data

US 2010/0250612 A1 Sep. 30, 2010

(51) Int. Cl.
G06F 7/00 (2006.01)
G06F 17/30 (2006.01)
G06Q 10/02 (2012.01)

(52) U.S. Cl.
CPC ................................... G06Q 10/02 (2013.01)

(58) Field of Classification Search
USPC .......................................... 707/799; 709/206
See application file for complete search history.

(56) References Cited

U.S. PATENT DOCUMENTS

| 4,675,647 A |   | 6/1987  | Salin et al.            |
|-------------|---|---------|-------------------------|
| 5,006,983 A |   | 4/1991  | Wayne et al.            |
| 5,566,278 A |   | 10/1996 | Patel et al.            |
| 5,689,698 A |   | 11/1997 | Jones et al.            |
| 6,059,184 A | * | 5/2000  | Ahlstrom et al. ... 235/375 |
| 6,529,786 B1 |  | 3/2003  | Sim                     |
| 6,654,815 B1 |  | 11/2003 | Goss et al.             |
| 6,682,055 B1 | * | 1/2004 | Tomlinson et al. ... 256/1 |
| 6,801,619 B1 |  | 10/2004 | Bae                     |
| 6,819,759 B1 |  | 11/2004 | Khuc et al.             |
| 6,961,418 B1 |  | 11/2005 | Thygeson et al.         |
| 2002/0038309 A1 |  | 3/2002 | Perkins et al.         |
| 2002/0091809 A1 |  | 7/2002 | Menzies et al.         |
| 2002/0105957 A1 |  | 8/2002 | Bondarenko et al.      |
| 2003/0028451 A1 |  | 2/2003 | Ananian                |
| 2003/0177141 A1 |  | 9/2003 | Sahlin                 |
| 2003/0231647 A1 |  | 12/2003 | Petrovykh              |
| 2005/0015286 A1 |  | 1/2005 | Rudnik et al.          |
| 2005/0027573 A1 | * | 2/2005 | Silberstein ........... 705/7 |
| 2005/0089053 A1 |  | 4/2005 | Zhu                    |
| 2005/0259653 A1 |  | 11/2005 | Reuveni                |
| 2006/0287923 A1 |  | 12/2006 | Watson et al.          |
| 2007/0280468 A1 | * | 12/2007 | Patel et al. ....... 379/265.01 |
| 2008/0082613 A1 | * | 4/2008 | Szeto et al. ........... 709/206 |
| 2009/0037306 A1 | * | 2/2009 | Hill .......................... 705/35 |

(Continued)

FOREIGN PATENT DOCUMENTS

| EP | 0 419 285 | 3/1991 |
| EP | 0149285 | 3/1991 |
| WO | WO 2005/010636 | 2/2005 |

OTHER PUBLICATIONS

International Search Report and Written Opinion of the International Searching of PCT/IL04/00010 Authority dated Sep. 27, 2007.

(Continued)

Primary Examiner — Alex Gofman
Assistant Examiner — Muluemebet Gurmu
(74) Attorney, Agent, or Firm — Pearl Cohen Zedek Latzer Baratz LLP

(57) ABSTRACT

A system and method for managing a queue may receive a selection of an image, symbol, or avatar from a user. The user may be associated with the selected image, which may provide an anonymous connection to the user. The selected image may be used to display a status of the queue and to summon the user to receive a service. Other embodiments are described and claimed.

20 Claims, 8 Drawing Sheets

(56) References Cited

U.S. PATENT DOCUMENTS

2009/0076875 A1* 3/2009 Lert et al. .................. 705/8
2009/0138807 A1* 5/2009 Fuhrmann et al. ........... 715/757

OTHER PUBLICATIONS

Office Action of U.S. Appl. No. 11/169,843 mailed on Jun. 24, 2008.
Final Office Action of U.S. Appl. No. 11/169,843 mailed on Jan. 28, 2009.
Office Action of U.S. Appl. No. 10/628,833 mailed on Feb. 6, 2008.
Final Office Action of U.S. Appl. No. 10/628,833 mailed on Sep. 30, 2008.
Office Action of U.S. Appl. No. 10/628,833 mailed on Mar. 12, 2009.
European Office Action issued for EP 10 158 168.4 and dated Aug. 22, 2011.

* cited by examiner

SYSTEM AND METHOD FOR QUEUE MANAGEMENT

BACKGROUND

Queue Management Systems (QMS) is a term widely used to describe solutions for Customer Reception and Flow Management (CRFM) systems. Existing queue management systems, often referred to as "Take-a-Ticket" systems typically include issuing a ticket bearing a number to a consumer of a service and summoning the service consumer to receive the service by displaying or otherwise announcing the number.

A shortcoming of existing systems is that a consumer of a service might fail to realize he or she is being summoned to receive a service, for example, by failing to notice their number is being displayed. Another deficiency of traditional queue management systems is the fact they do not enable service consumers any control of the way they are being summoned to receive a service.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
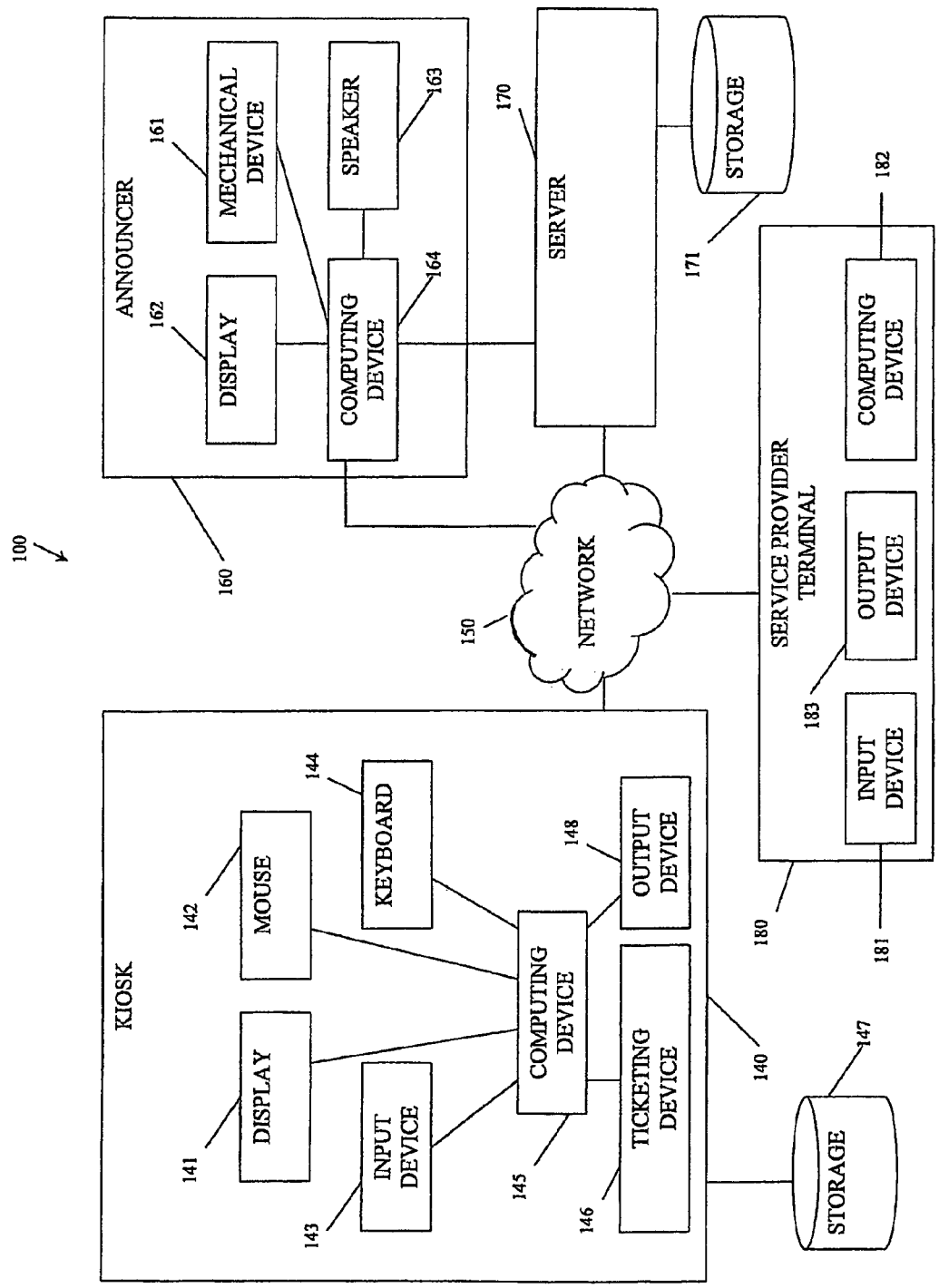
FIG. 1 shows a high level block diagram of a queuing system according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time.

Embodiments of the invention are directed to managing one or more queues at an organization. Typically, the queues are virtual, in that the users in the queue are not actually lined up. The users are typically physically present at the site for a service, meeting or other transaction, but need not be at the site the entire time they are in the queue. Typically, when a user is served, a face-to-face meeting with an agent occurs. The users may have a queue status presented publicly (e.g., on a monitor viewed by everyone in a waiting room) but without information easily identifying the user. For example, a queue status (e.g., an ordered line of anonymous images, each image corresponding to a user) may be displayed. When a user desiring to enter a queue or to meet with a service representative arrives at a site, the user may be presented with a selection of images, avatars, multimedia content or any other applicable digital information or objects. The user may make a selection of a specific object, to be associated with the user. The selected object may be used to for example provide queue status and summon the user when the user reaches the head of the queue. The images may be anonymous and may not provide identification information regarding the user: without access to non-public portions of the system, it may not be possible for third parties to find the name or identity of the user purely via the image. While conventional systems may use, e.g., numbers, to identify a person in a queue ("take a number"), the images described herein are typically not alphanumeric.

Reference is made to FIG. 1 showing a high level block diagram of a queuing system 100 according to embodiments of the invention. Queuing system 100 may include an information kiosk 140, a service provider terminal 180, a server 170 and an announcer 160 all of which may be capable of communicating over network 150. Kiosk 140, network 150, service provider terminal 180, server 170, announcer 160 and network 150 are described in further details herein. The system may include multiple kiosks, terminals, servers, and announcer, and one terminal may support multiple terminals, kiosks, and announcers. Networks 150 may include multiple networks. In general, server 170 may coordinate the actions of components of system 100 and provide central storage of information, and in addition may communicate with other enterprise databases storing for example customer, product or service information.

Kiosk 140 may be used to interact with a user or consumer, such as a service consumer, for example in a facility that provides services. For example, customers or users entering a bank or a mobile phone repair center or patients arriving at a medical facility may use a kiosk such as kiosk 140 to receive information, schedule appointments, enter a queue for a service or conduct other operations related to services provided by the associated facility. In some embodiments, a user, when first entering an organization or facility, may provide user identification information (e.g., a name, a customer identification number) or a transaction code or other information. The kiosk 140 or system 100 may user the information provided to find and display user information such as an appointment, a transaction, or other information. In such cases, system 100 may interact with enterprise systems or databases.

A customer may interact with system 100 via devices other than kiosk 140, and the functions of kiosk 140 may be divided among other components. Kiosk 140 may include a display 141 that may present information to and take input from a service consumer. Display 141 may be any suitable display as known in the art, e.g., a monitor (e.g., a flat-screen or CRT) connected to computing devices such as a personal computer (PC). Display 141 may be built-in, e.g., an integral part of kiosk 140. Information presented on display 141 may include any relevant information pertaining to goods or services provided by the relevant facility. For example, if kiosk 140 is placed in a medical facility then display 141 may provide information such as a list of medical services provided by the facility, a list of medical departments and their location, medical staff personnel currently available and/or any information that may typically be provided by an information providing entity. Alternately, kiosk 140 may display only queuing information. Kiosk 140 may be used for interacting with a user, e.g., display various services that may be selected, provide a user with feedback and the like.

Kiosk 140 may further include input devices such as mouse 142, keyboard 144 or any suitable input device 143. For example, input device 143 or display 141 may be a touch screen and thus include an input device 143, or input device 143 may be any point and click device, an electronic touch pad, an electronic pen, a magnetic card reader or any other applicable input device. Kiosk 140 may include an output device 148. Output device 148 may be, for example, a speaker or any other suitable output device. Kiosk 140 may include a ticketing device 146. Ticketing device 146 may be a device capable of printing information on paper, plastic or other media and providing media bearing printed information to a user; ticketing device 146 may simply be a printer. Kiosk 140 may include or be operatively connected to a storage device 147. Storage device 147 may be any suitable storage device, e.g., a hard disk, a memory chip, a universal serial bus (USB) storage device, a removable storage media or any other applicable storage device. Kiosk 140 may include a controller, processor or computing device 145. Computing device 145 may be a computing device such as computing device 200 described herein with reference to FIG. 2. Computing device 145 may control an operation of various components of kiosk 140. For example, computing device 145 may control mouse 142, keyboard 144, display 143, ticketing device 146 and storage device 147. Computing device 145 may coordinate the operation of the components of kiosk 140 and may further communicate, possibly by a network interface card (NIC), with network 150 and other computing devices connected to network 150.

Embodiments of the invention may manipulate data representations of real-world entities such as users in a queue or line, and create or process this information, possibly using other information, to create and display new and useful information or data derived from this information, such as for example the place or status of a user in a line.

According to embodiments of the invention, queuing system 100 may include a network 150. Network 150 may include or may be part of a private Internet protocol (IP) network, the Internet, an integrated services digital network (ISDN), a set of frame relay connections, modems connected to a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding and/or any other suitable communication means. It will be recognized that embodiments of the invention are not limited by the nature of network 150.

Queuing system 100 may include an announcer 160. Announcer 160 may be used to announce, display, sound or otherwise convey information to an audience. For example, announcer 160 may announce the next patient to see a specific doctor or the next customer to receive a service. Announcer 160 may include a monitor or display 162 that may be any suitable one or more displays that may present any graphical information. Announcer 160 may be an electronic and/or electric display that may be used to display relevant information. For example, display 162 may be or may include a flat screen, plasma or cathode ray tube (CRT) display or any other suitable display system. Announcer 160 may include a speaker 163 that may be used to audibly announce any applicable information. More than one announcer may be used; e.g., one per room among several rooms, in some embodiments of the invention, announcer 160 may be connected, e.g., by wired or wireless technology, to a number of remote displays 162.

Announcer 160 may include any applicable mechanical device 161 that may be used to announce or inform users of events or other issues. For example, mechanical device 161 may be a mechanical display system such as seen and used in airports and train stations for displaying arrival and departure information. Announcer 160 may include a controller, processor or computing device 164. Computing device 164 may be a computing device such as computing device 200 described herein with reference to FIG. 2. Computing device 164 may control an operation of various components of announcer 160. For example, computing device 164 may control display 162, speaker 163 and/or mechanical device 161. Computing device 164 may coordinate an operation of components of announcer 160 and may further communicate, possibly by a network interface card (NIC), with network 150 and other computing devices connected to network 150.

According to embodiments of the invention, queuing system 100 may include a server 170. Server 170 may be or may include a computing device such as computing device 200 described herein with reference to FIG. 2. Server 170 may include or be operatively connected to a storage device 171. Storage device 171 may be any suitable storage device, e.g., a hard disk, a memory chip, a universal serial bus (USB) storage device, a removable storage media or any other suitable storage device. Server 170 may execute various applications related to queue management. Server 170 may store, e.g., on storage 171, any relevant information that may be required for the management and operation of queuing system 100. Server 170 may also be used by an administrator to manage queuing system 100, update information, e.g., services, staff related information and the like.

Queuing system 100 may include a service provider terminal 180, used by a service provider, sales representative, or other person providing a service for or otherwise interacting with a user or customer. For example, a teller in a bank may use service provider terminal 180 when servicing a customer in order to receive information related to the customer and/or provide queuing system 100 with information related to the customer. A nurse or receptionist in a medical facility may use service provider terminal 180 to inform queuing system 100 that a specific patient has been treated and that no other treatments or services are required or pending. Such information may be used by queuing system 100, for example, in order to remove the patient from one or more lists or release other resources. Service provider terminal 180 may be a terminal or for example a execute thin client as known in the art and may include components.

Service provider terminal 180 may include input device 181 that may be a point and click device such as a mouse, a keyboard, a touch screen or any other suitable input device. Service provider terminal 180 may include an output device 183 that may be a display such as display 141 or display 162. Service provider terminal 180 may include a controller, processor or computing device 182 that may be a computing device such as computing device 200 described herein with reference to FIG. 2. Computing device 182 may control any component of service provider terminal 180, e.g., output device 183 or input device 181, communicate with other components of queuing system 100 over network 150 and perform any other required operations related to the functionality of service provider terminal 180.

Figure 2:
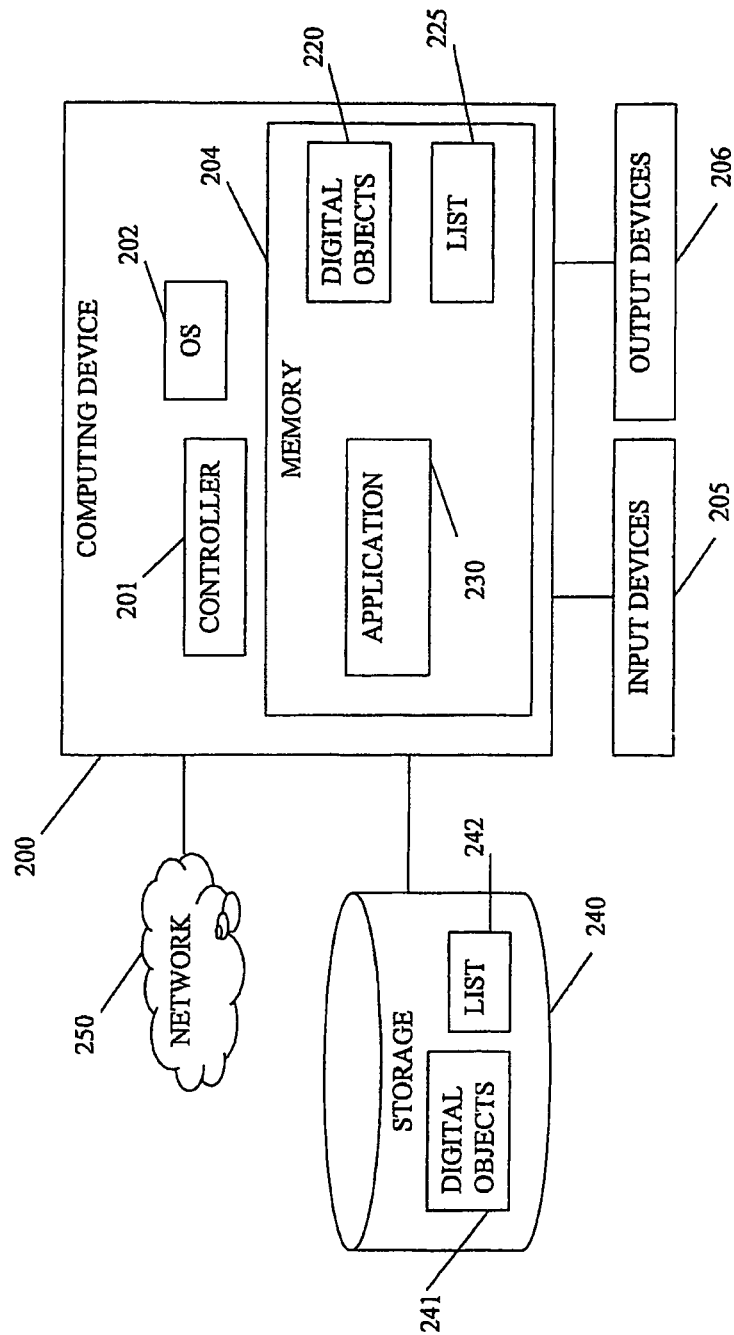
FIG. 2 shows a logical block diagram of a computing device according to embodiments of the invention.

Reference is made to FIG. 2 showing a computing device 200. According to embodiments of the invention, computing devices 145, 164, 182 and server 170 may be substantially similar to computing device 200 or may include any components included in computing device 200 and described herein. While computing device 200 and its components are provided as an example any suitable processor or computing device may be used for computing devices 145, 164, 182 and server 170. Computing device 200 may include a memory 204, central processing unit (CPU) or controller 201, storage device(s) 240, an operating system (OS) 202, input device(s) 205 and output device(s) 206. Storage device 240 may be any suitable storage device, e.g., a hard disk, input devices 205 may include a mouse, a keyboard or any suitable input devices and output devices 206 may include one or more displays, speakers and/or any other suitable output devices. Input devices 205 and/or output devices 206 may include any applicable input/output (I/O) devices such as a network interface card (NIC), universal serial bus (USB) interface module or any other I/O devices.

According to embodiments of the invention, application 230 may be loaded into memory 204, for example, from storage 240 and may be executed by controller 201 under operating system 202. For example, application 230 may be any software tool, program or application related to queue management, e.g., ticketing, announcement or scheduling and may be loaded into memory 204 from storage device 240, any other storage system, or over network 150 and executed by controller 201. Application 230 may perform or help to perform methods described herein. Other objects may be loaded into memory 204 and used by applications such as application 230, for example, digital objects 220 that may be or may include video information, or audio information. Another exemplary object that may be loaded into memory 204 may be list 225, such list may be a list of users or customers awaiting service or a free list of digital objects or images symbols, or avatars that may be selected by users to represent the users in queues, or a linked list associating customers with services and/or digital objects such as digital objects 220. Objects loaded into memory may be retrieved from storage device 240, for example, applications or digital objects 241 and/or lists 242 may be retrieved from storage device 240 and loaded-into memory 204 and used by applications or programs executed by controller 201. Not all components or data objects shown in the example computing device 200 may be placed in, for example, a kiosk, announcer, server, or other device in embodiments of the present invention.

An exemplary method for managing, controlling or otherwise maintaining a queuing system for, for example, allocating a limited resource to a number of users, clients or consumers of such resource may include presenting to the user a selection of images, avatars, multimedia content or any other applicable digital information or objects, receiving from the consumer a selection of a specific object, associating the consumer with the selected object, and using the selected object, for example, by displaying, presenting, activating or otherwise providing it, to summon the consumer when the resource may be allocated to the consumer. For example, a patient (e.g., consumer of a limited resource) arriving at a clinic may be required to enter a queue in order to see a specific medical staff member (e.g., limited resource). Such a patient may provide system 100 with a selection of an image symbol, or avatar that may be presented on display 141 of kiosk 140. A controller in computing device 145 may associate the patient with his or her selected image and the selected image may be displayed on display 162 of announcer 160 when the medical staff member is ready to see the patient. The terms "consumer", "consumer of a resource", "consumer of a service", "customer" and "user" may all refer to a person using or associated with embodiments of the invention as a queuing method and/or system and may be used interchangeably hereinafter.

Figure 3:
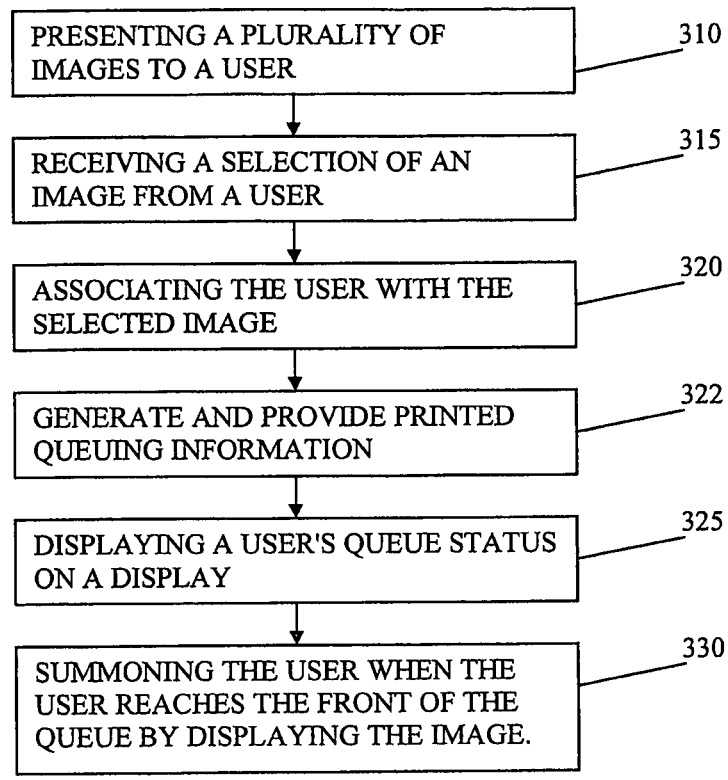
FIG. 3 is a flowchart for queue management according to embodiments of the invention.

Reference is made to FIG. 3 showing an exemplary flowchart for queue management according to embodiments of the invention. As shown by block 310, the flow may include presenting one or more objects such as images, symbols or avatars to a user. For example, a number of images may be presented on display 141 of kiosk 140. Input device 143, mouse 142 and/or keyboard 144 of kiosk 140 may be used by a user to scroll or browse through images. Objects such as images presented for selection may be graphical images such as various figures, "smiley faces", cartoon images, avatars and the like. The objects presented to the user may be randomly selected from a large pool of objects; for example 10 objects may be selected from a pool of 1,000 objects. If a use has selected an object and the object has not been released (e.g., when the user leaves the queue by for example being served), the object may not be available for another user.

In addition to images as described, any applicable digital information or objects, e.g., multimedia content comprising, for example, visual and/or sound effects may be presented to a service consumer as shown by block 310. Input device 143, mouse 142 and/or keyboard 144 of kiosk 140 may be used by a user to activate or otherwise interact with displayed information. For example, possibly prior to selecting it, a user may activate a multimedia object such as a video clip or a sound track. According to embodiments of the invention, images or objects presented to a user may be unique in the sense that no two images presented to a user within one system, or within a subset of a system, are identical. Furthermore, images or objects presented to a user as shown by block 310 are in one embodiment easily distinguishable from each other by a user, and/or easily distinguishable from other objects in use currently by other users. For example, presented objects may differ in color, ethnicity, hair color, shape, size, sound, animation etc.

Images presented to a user or consumer of a service may be or may be associated with one or more digital objects. Such digital objects may include various information and/or content. For example, digital objects 241 and/or 220 (FIG. 2) that may be or may be associated with images selectable by a user, may be, may include or may be associated with audio information, graphical information, animation information or any applicable information. According to embodiments of the invention, in addition to presenting graphical images to a user, kiosk 140 may provide a user with a variety of selectable attributes or content that may be associated with a selected image. For example, output device 148 may be a speaker and may enable a user to listen to a selection of audio contents. Such audio content may be associated by the user with a selected image. Other attributes that may be selected and associated with an image may be for example, animation. For example, after selecting an image, a user may select one of a number of animations that may be associate with or applied to the image, e.g., the image may be caused to jump, run, dance or perform any other animation. In some embodiments, a customer may associate a number of animations with a selected avatar or object. For example, a first animation may be used when the user is waiting to be summoned, for example when displaying a queue status on display 162, while a second selected animation may be used when the customer is being summoned to receive a service. Similarly, audio content may be selected by a consumer of a service and associated with a selected image. For example, a user may select a tune, a spoken phrase or any other applicable audio content to be associated with an image.

Computing device 145 or a controller in computing device 145 may utilize display 141 and output device 148 to present to a user an image symbol, or avatar and associated attributes. A user may use input device 143, mouse 142 and/or keyboard 144 and display 141 to interact with kiosk 140 in order to be provided or presented with available selections of images and attributes that may be associated with them. Images and attributes or other content that may be associated with such images may be stored in storage device 147 operatively connected to kiosk 140 or they may be stored on storage device 171 operatively connected to server 170. For example, server 170 may store a global list comprising all images in system 100 and a second list (e.g., a "free list") comprising images that are currently available for selection, e.g., not selected by any customer. Accordingly, upon being selected by a customer, an image may be removed from a free list of available images and upon providing a service to a customer, or when the customer leaves the queue, the associated image may be returned to the free list, thus becoming once again available for selection by a different customer. The set of images associated with the users in a queue may each differ from one another.

Server 170 may interact with a number of kiosks and may update a number of kiosks such as kiosk 140 each time an image is selected by a customer. Accordingly, storage 147 connected to kiosk 140 may only store images that are available for selection by a user, e.g., storage 147 may store an updated free list of images. According to embodiments of the invention, a number of kiosks such as kiosk 140 may be placed in a facility. Accordingly, upon being notified of a selection of an image, server 170 or another central entity may inform or update all kiosks in a facility to reflect such selection. For example, server 170 may update the free list of images on storage 147.

Alternatively, management and maintenance of images and other content may be centrally performed, for example by server 170. In such scenario, one or more kiosks 140 may generally act as terminals, mainly providing user interface while server 170 performs the actual functions related to image selection, association etc. In such case, any information presented to a customer as well as information provided by a customer may be exchanged between server 170 and kiosk 140 over network 150. Storage of available images, and other functionality of a kiosk, may be controlled by server 170. Kiosk 140 may be a thin client, simply displaying an application operated by server 170 and accepting user input from kiosk 140.

Allowing two or more users, service consumers, or customers to select the same image may be enabled if some attributes of such image are distinguishably different with respect to the respective customers. For example, two customers may be enabled to select the same image provided the selected image associated with the first customer is also selected to be red while the image associated with the second customer is selected to be green. Alternatively, different animations, audio content or other attributes may be associated with the selected image with respect to the two customers.

Figure 4:
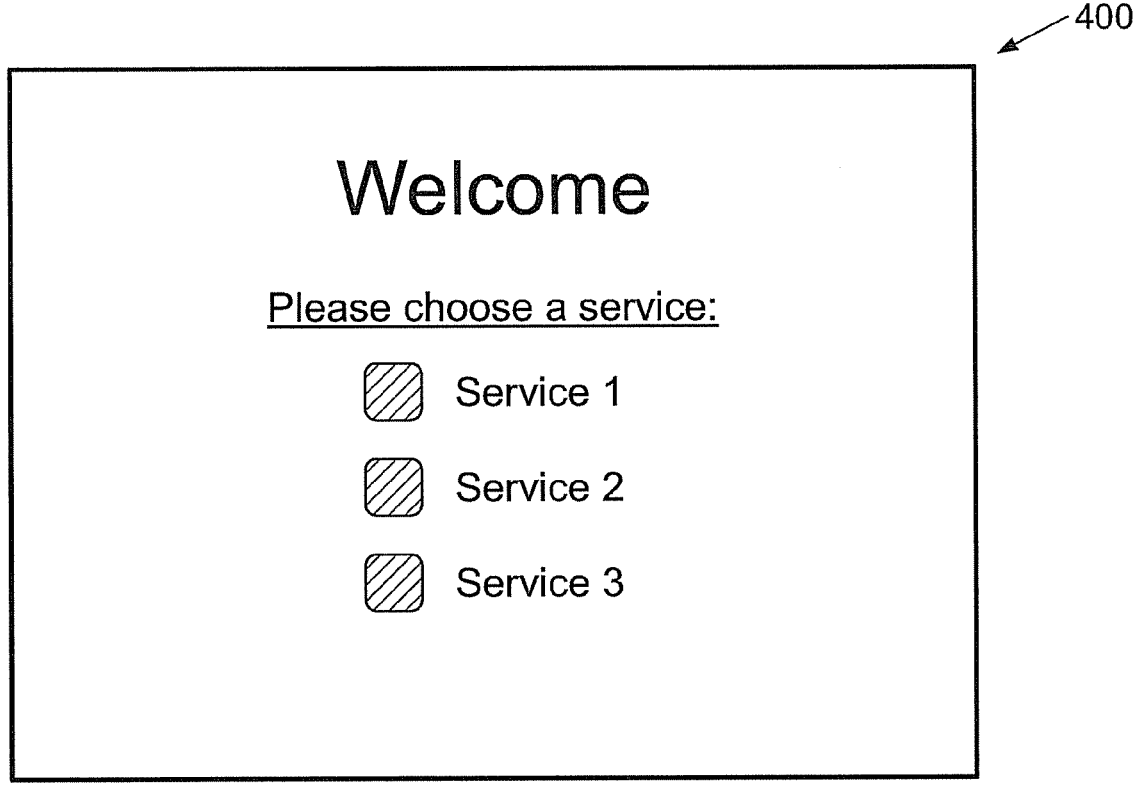
FIG. 4 is an exemplary screen shot according to some embodiments of the invention.

In some embodiments, a user may have a pre-existing appointment before approaching a kiosk. In other embodiments, the user may simply enter a queue via the kiosk. The site or system may support multiple queues, and multiple services (e.g., product sales, product repair, etc.). Alternately, only one queue may be supported. If multiple queues are supported, a display may display symbols or objects representing multiple queues. According to some embodiments of the invention, a selection of an image or object to be used for summoning a customer to receive a service may be subsequent to a selection of a service. Reference is additionally made to FIG. 4 showing an exemplary screen shot 400 according to some embodiments of the invention. As shown by screen shot 400, a user may be prompted to select a service. For example, display 141 may display information such as shown by screen shot 400 and a user may use mouse 142 to select one of service 1, 2 or 3 shown. Following a selection of a service, the user may be prompted to select an image. If only one service is offered, or if for example a user's identifying him or herself allows the system to identify the user and a preexisting appointment, or for other reasons, no service may need to be selected.

Figure 5:
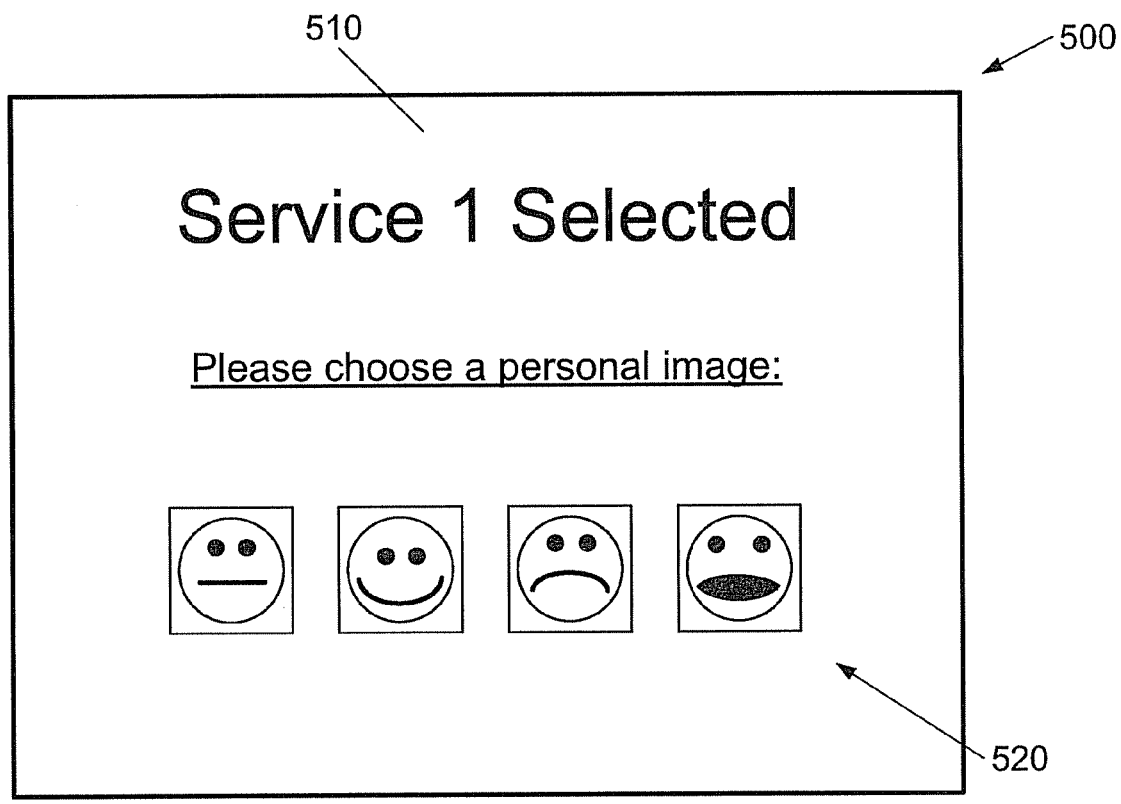
FIG. 5 shows an exemplary screen shot according to some embodiments of the invention.

Reference is additionally made to FIG. 5 showing an exemplary screen shot 500 according to some embodiments of the invention. As shown by block 510, possibly after selecting a service, a user may be informed of the selected service and may additionally be prompted to select one of images 520.

As shown by block 315, a selection of an image may be received from a user or consumer of a service. For example, a customer may use keyboard 144 or mouse 142 to select an image presented on display 141 of kiosk 140. As described herein, other attributes or associated content may be similarly selected by a customer. For example, a user may select an avatar, then select attributes such as animation, color and sound effect, activate the avatar to actually see it animated, in the selected color, and accompanied by the selected sound effect. The user may submit such composite selection, for example, by clicking a "Select" button displayed on display 141 using mouse 142.

As shown by block 320, a selected image and attributes may be associated with a user. In addition, unique identification code or parameter may be generated by a controller in computing device 145 or in server 170 and provided to a user. Such identification parameter may be associated with the selected image. For example, upon receiving a selection of an image and/or various attributes such as color, animation and/or sound, a unique identification code or parameter may be generated, for example, by server 170. Such identification parameter may be printed on a ticket by ticketing device 146 and provided to the user. Such identification parameter may be associated with the selected image or the selected digital objects thus an association of the user with the selected objects is achieved as a result of the user and the selected objects being associated with the same identification parameter. Alternately, an identification code or parameter in addition to the image need not be used.

Other methods of associating a user with an image may be performed by embodiments of the invention. For example, a user may be prompted to provide a user selected code, password or parameter that may be known only to the user. Such code or password may be associated with the selected object thus associating the selected object with the user. According to embodiments of the invention, associating a parameter such as a password or identification number may be performed by storing an entry in a table, list or database. For example, such entry may include two fields, the first containing an identifier of, or a pointer to, the digital object, and the second field may contain the password, code or identification parameter. It will be recognized that embodiments of the invention are not limited by the computing or storage methods or structures used to associate a parameter or digital objects with a user.

Figure 6:
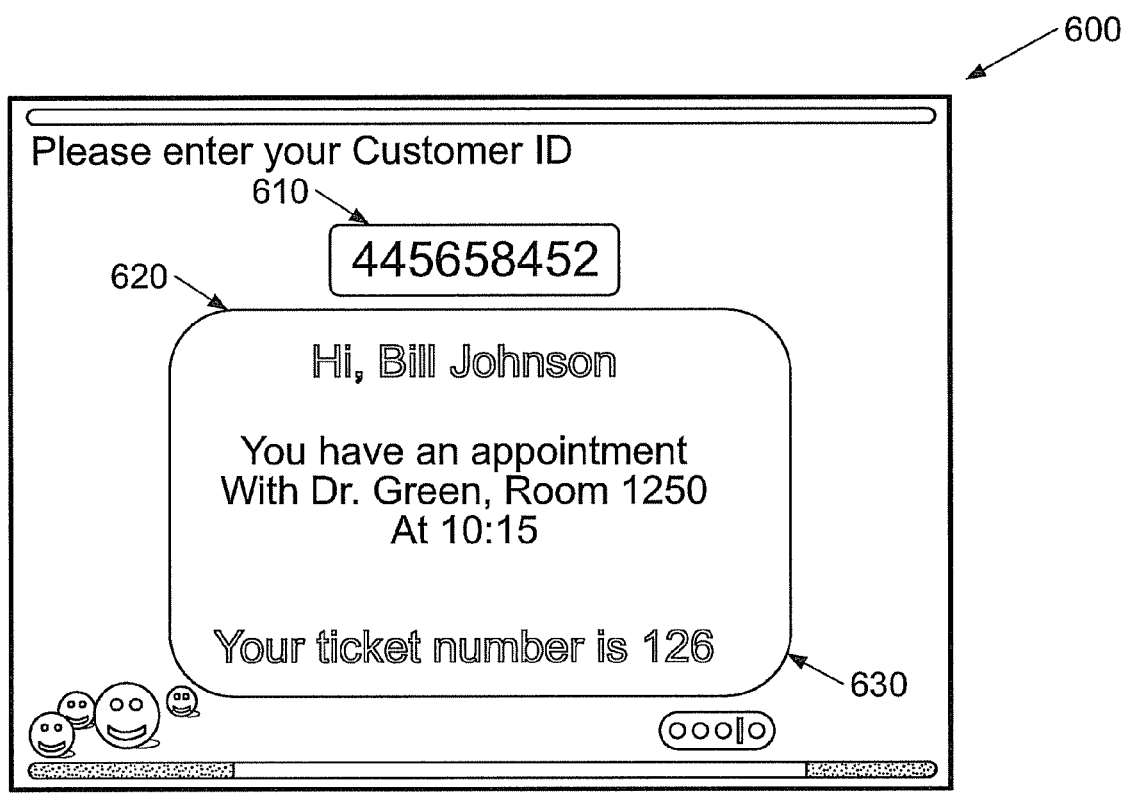
FIG. 6 shows an exemplary screen shot according to some embodiments of the invention.

A user may register or otherwise provide and receive identifying details to/from a service provider and may accordingly be identified, for example, by system 100. For example, during a registration a user may be provided with an identification number, code or parameter, for example, stored on a magnetic card. Reference is now additionally made to FIG. 6 showing an exemplary screen shot 600 containing information that may be displayed by, for example, display 141 of kiosk 140. A customer may, upon arrival to a location where a service is provided, interact with a reception entity such as kiosk 140. As shown by block 610, the customer may enter an identification code or parameter previously provided. As shown by block 620, a dialog box or other graphical object may provide the user with information such as for example, the user's name (as a form of verification), details related to the service to be provided, schedules, details such as name of personnel or service provider to meet and a code or parameter such as a ticket number as shown by 630. Alternately, since an object or image may act in place of a ticket number in informing a user of their place in a queue, a ticket number need not be used.

In block 322, a ticket, receipt or other token or indicator may be generated or presented to the user. Information generated and/or presented to the user may include any relevant or applicable queuing information. For example, a ticket including the object or image presented to the user may be printed and presented to the user. The ticket may include other information, such as a customer number, an advertisement (possibly tailored to the user or the service associated with the user). If customer anonymity is desired (which may be achieved by associating an object rather than a name with a customer), the ticket may include only information that cannot be easily connected to the customer's identity, such as an image chosen by the customer.

The image or object selected by the user, a user selected code, details related to the service or resource for which the user is waiting and/or any other relevant or applicable information may be printed on the ticket that may be printed by ticketing device 146. Such printing may provide the user with proof of association with the image. Such printing may further provide a way for the user to recall the selected image or object. Various other information may be printed on a ticket by ticketing device 146. For example, the number of service consumers waiting to be served, the average or expected wait time and/or any other information that may available to, or computed by a queuing system as known in the art. In the case that anonymity is desired, a minimal amount of information, such as only the object, may be printed on the ticket.

As users are served by service providers (who may operate, for example, service provider terminals 180), users advance in the queue. Multiple queues may be used (e.g., one queue per doctor). One queue may feed into multiple service providers (e.g., multiple doctors each servicing the next person in one queue). Typically, the first user in a queue has an associated object shown in a queue on a monitor, and this first, "being served now" object, may be displayed differently from other objects in the queue to show that the associated user is being served first. For example, the object may be enlarged, bordered, framed, or otherwise emphasized, but this need not be the case. As users complete being served, they are taken off the queue, their object is removed, for example, from display 162, and objects in the queue displayed on the monitor may advance. In some embodiments, objects associated with users being served need not be displayed.

As shown by block 325, a queue status, state or any other relevant information related to consumers of a service waiting to be served may be displayed or presented, for example on display 162 or via another device or devices. The status may be displayed using the image, symbol or avatar associated with the user. The queue status may include, for example, an ordered list or line showing all or some of the people waiting in a queue, the first person in the queue, the person currently being served, an estimated wait time, or other information. People or users may be represented in a queue status by, e.g., numbers, names, or images or symbols associated with the people. A virtual queue, e.g., a line of objects or images, may be displayed on the screen, where the objects are displayed in the same order that their associated users occupy in the real queue. The queue may have a queue status (some description of the state of the queue) and a user may have a queue status (e.g., the user's position in the queue, the user's estimated wait time, etc.)

Figure 7:
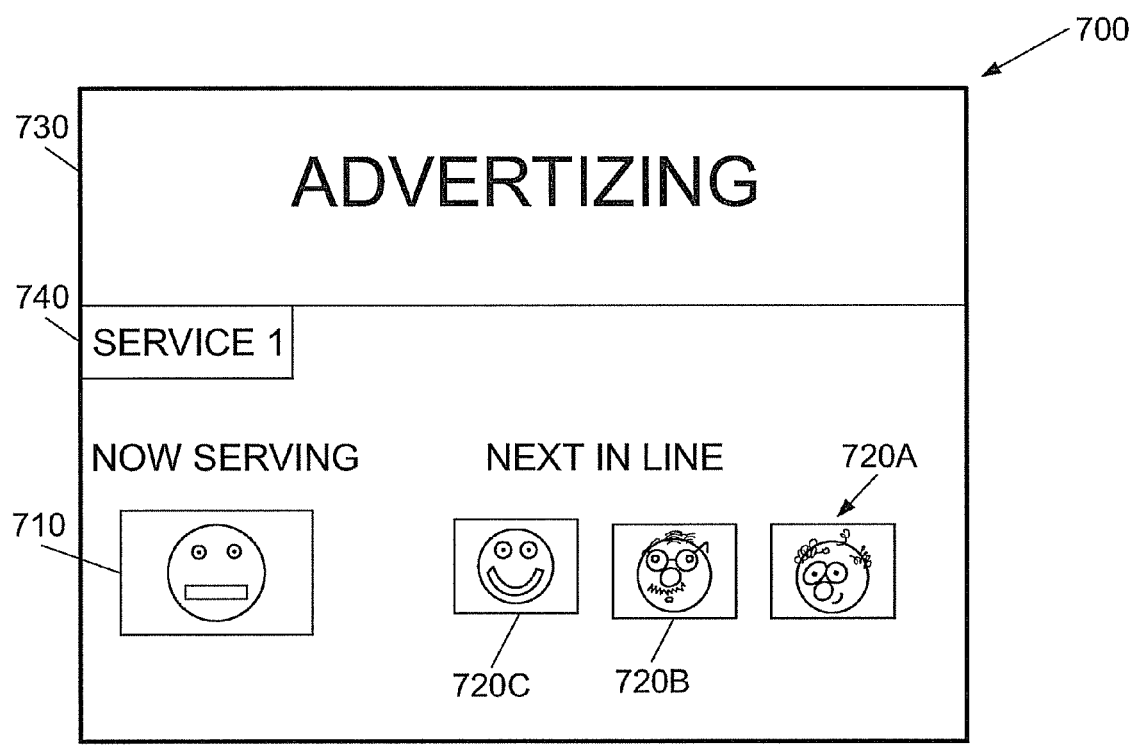
FIG. 7 shows an exemplary screen shot according to some embodiments of the invention.

Reference is made to FIG. 7 showing an exemplary screen shot 700 containing information that may be displayed. For example, display 162 of announcer 160 may present information such as shown by screen shot 700. As shown by region 740, the relevant queue may be indicated. For example, the name of a physician, or a description of a technical service may be displayed by region 740. A queue may correspond to a service. As shown by block 710, the customer currently being served may be indicated by the image or avatar selected by that customer. Similarly, as shown by blocks 720A, 720B and 720C, other customers associated with the service indicated by block 740 may be indicated by their selected images or objects. The order by which the images are displayed may reflect the queue order, for example, the customer associated with block 720C may be next in line, and the customer associated with block 720B may be ahead of the customer associated with block 720A. An object associated with only one next-in-line customer may be shown, or objects associated with multiple customers waiting in a queue may be displayed. Accordingly, display 162 may display information pertaining to a number of queues, possibly related to a number of services, service providers or other resources. As shown by block 730, a portion or region of a display presenting queue information, state, status or other information may be allocated to advertisements. Such advertisements may be related to the local facility or may be sponsored by another entity or body.

Although exemplary images are shown by blocks 710 and 720, according to embodiments of the invention any digital information, e.g., animated avatars or multimedia content may be associated with customers and may accordingly be used to display a queue status (e.g., the user's position in the queue, if the user is being called or served, etc.). For example, instead of images 710 and 720, animated avatars may be displayed to inform the queue status. Other means, for example, customer selected sound effects or text strings may also be displayed in association with displayed selected images or other objects.

Figure 8:
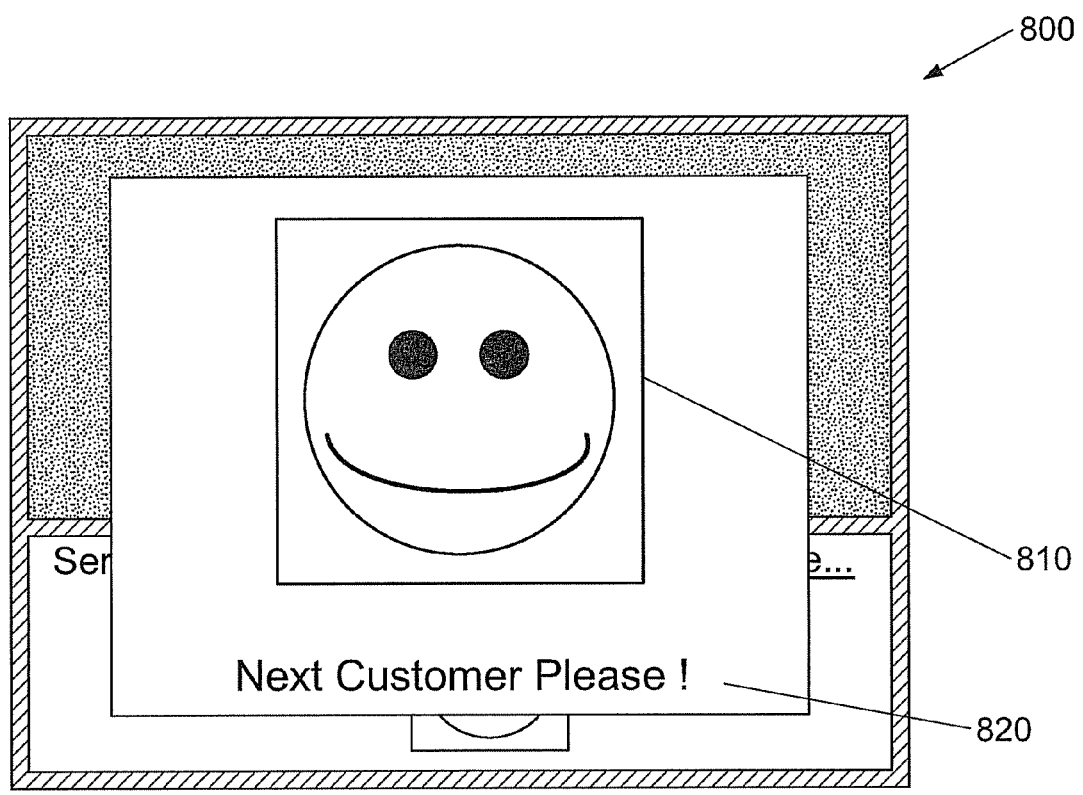
FIG. 8 shows an exemplary screen shot according to some embodiments of the invention.

As shown by block 330 of FIG. 3, the method may include calling or summoning the user or customer to receive a service by displaying or altering the display of the selected object or image, or activating the selected object. The object associated with a user being called may be displayed differently from objects associated with other users. Reference is additionally made to FIG. 8 showing an exemplary screen shot 800 containing information that may be displayed upon summoning a customer to receive a service. For example, the first user in the queue, which is the user currently being served, may have his or her associated object or image shown as enlarged. In addition, when a user is called to be the currently served user, their object may temporarily (e.g., for 30 seconds or another relatively brief period) be enlarged in a space separate from, overlayed on, or in addition to the area showing the queue, to, e.g., occupy a large part of the display.

As shown by block 810, an image selected by, and associated with a customer may be displayed and may further, for a period of time, occupy a substantial portion of a display associated with the relevant queue, for example, display 162 of announcer 160. As shown by region 820, additional information may be displayed. For example, a predefined text string or a user selected text string may be displayed. Sound or other effects, possibly selected by a user may also be provided upon summoning a customer to receive a service. For example, speaker 163 of announcer 160 may be used to provide sound effects that may have been selected by the customer being summoned. According to embodiments of the invention, upon summoning a customer, the selected digital object may be activated to produce substantially the same effect provided when being selected with reference to block 310. For example, the selected colors, text, animation and sound effects previously selected by the customer may be reproduced at this stage.

According to embodiments of the invention, upon concluding providing a service to a customer, a service provider may user service provider terminal 180 to perform various management or other tasks. For example, service provider terminal 180 may provide a bank teller with information related to the customer currently being served by the teller. Such information may include the image or animated avatar selected by the user, a code or parameter associated with the customer, which may also be printed on a ticket provided to the customer. For example, such information may be displayed on output device 183 that may be a display. A service provider may use service provider terminal 180 to interact with queuing system 100, for example to remove the customer from the relevant queue and cause queuing system 100 to return the selected image or avatar to a free list.

In some embodiments of the invention, various components or features of system 100 described herein may be included in a single or plurality of substantially identical or similar devices. For example, an automated teller machine (ATM) or other device may include kiosk 140, announcer 160 and server 170 or the functionality of these units. Accordingly, the ATM may perform functionalities described herein with reference to system 100. For example, the device may associate users with avatars, provide printed reference to a queue, display a queue status or state using such avatars and summon a user to use the ATM by displaying or activating an avatar. It will be recognized that the distribution of functionalities as described with reference to system 100 may be implementation dependent and that embodiments of the invention are not limited in this respect.

According to embodiments of the invention, methods, procedures, functions and/or operations described herein may be performed by an apparatus, device, machine or any other suitable equipment, e.g., computing device 200. For example, a computing device equipped and/or outfitted with suitable hardware and/or firmware components and further executing one or more programs, applications, scripts and/or any suitable software code and digital information may perform methods, procedures, functions and/or operations described herein. Such software may further be divided to modules. For example, a first module may handle input output and network connectivity, a second module may handle data integration and/or analysis, a third module may perform rules execution and conflict resolution etc.

Some embodiments of the present invention may be implemented in software for execution by a processor-based system. For example, embodiments may be implemented in code and may be stored on a storage medium having stored thereon instructions (e.g., computer-readable instructions) which can be used to program a system to perform the instructions or which, when executed by a processor or controller, cause the processor or controller to carry out a method according to an embodiment of the present invention. The storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Such a system may include components such as, but not limited to, a plurality of central processing units or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:

using a processor, providing a user with a plurality of images from a free list of images available to use as an avatar to be used to indicate a user's place in a queue;

receiving a selection of an image from among the plurality of images from the user, the user waiting in the queue;

in response to the user selection, removing the image from the free list using the processor;

using the processor, associating the image with the user, wherein for each user in the queue, a different image is associated with that user;

using the processor, displaying a user's queue status on a display using the image; and using the processor, summoning the user from the queue to receive a service when the user reaches the front of the queue by displaying the image on the display.

2. The method of claim 1, comprising displaying a plurality of images associated with a respective plurality of users waiting in the queue.

3. The method of claim 2, wherein said summoning comprises displaying the image differently than others of the plurality of images.

4. The method of claim 1, wherein the image is associated with an audio content and wherein displaying the image comprises sounding the audio content.

5. The method of claim 1, wherein none of the plurality of images provided to the user are associated with a user currently in the queue.

6. The method of claim 1, comprising printing on a ticket the image.

7. The method of claim 1, comprising:

associating the user and the service with an identification parameter;

providing the user with a printed ticket, the ticket having printed thereon the identification parameter; and upon summoning the user to receive the service, displaying the identification parameter.

8. A system comprising:

a controller to:

provide a user with a plurality of images from a free list of available images available to use as an avatar to be used to indicate a user's place in a queue, receive a selection of an image from among the plurality of images from the user, the user waiting in the queue, remove the image from the free list, and associate the image with the user, wherein for each user in the queue, a different image is associated with that user; and a display to:

display a queue status using the image; and summon the user from the queue to receive a service when the user reaches the front of the queue by displaying the image.

9. The system of claim 8, wherein the display is to display a plurality of images associated with a respective plurality of users waiting in the queue.

10. The system of claim 8, wherein to summon the user the display displays the image associated with the user differently than others of the plurality of images.

11. The system of claim 8, wherein none of the plurality of images provided to the user are associated with a user currently in the queue.

12. The system of claim 8, wherein the controller is to cause a printing of the image on a ticket.

13. A method of managing a queue comprising:

displaying to a user desiring to enter the queue a plurality of images from a free list of images available to use as an avatar to be used to represent a user in the queue;

receiving from the user a selection of an image of the plurality of images;

removing the selected image from the free list such that the image is not available to another user;

and displaying to the user on a monitor the place the user has in the queue using the selected image, wherein the queue is a queue to meet with a person providing a service, and wherein the selected image does not provide identification information for the user, the queue comprising a plurality of users, each user associated with a different image.

14. The method of claim 13, comprising storing a plurality of images, and wherein the images presented to the user are a subset of the stored images.

15. The method of claim 1, comprising, when a user leaves the queue, returning the image associated with the user to the free list.

16. The system of claim 8, wherein the controller is to, when a user leaves the queue, return the image associated with the user to the free list.

17. The method of claim 1, wherein the image is not alphanumeric.

18. The system of claim 8, wherein the image is not alphanumeric.

19. The method of claim 1, comprising providing information regarding the customer to a service provider at a service provider terminal.

20. The system of claim 8, comprising a service provider terminal.

* * * * *